April 4, 1950        A. D. KRUGLER        2,502,525

CONTROLLED CYCLE RELIEF VALVE

Filed July 5, 1944        2 Sheets-Sheet 1

INVENTOR
A.D. KRUGLER
BY Hudson Young & Yinger
ATTORNEYS

April 4, 1950   A. D. KRUGLER   2,502,525
CONTROLLED CYCLE RELIEF VALVE
Filed July 5, 1944   2 Sheets-Sheet 2

INVENTOR
A. D. KRUGLER
ATTORNEYS

Patented Apr. 4, 1950

2,502,525

UNITED STATES PATENT OFFICE 2,502,525

CONTROLLED CYCLE RELIEF VALVE

Allen D. Krugler, Detroit, Mich., assignor to Phillips Petroleum Company, a corporation of Delaware Application July 5, 1944, Serial No. 543,581

12 Claims. (Cl. 62—1)

This application relates to a system for transferring liquefied gases and their vapors and methods for such transfer. It has particular relation to the problem of transferring liquid butane and/or propane from railway tank cars to storage tanks with a minimum fire hazard to the tank car and to the storage tanks. This application is a continuation-in-part of my application which has matured into Patent 2,356,410, granted August 22, 1944.

In the handling of inflammable hydrocarbons in the liquid form in railway tank cars, fire hazards are often created. The usual method of transfer known to the prior art is to force the liquid out of the tank car through a liquid line to the storage tank by means of vapor of the same gas or gases collected from the storage tank and pumped into the upper portion of the railway tank car. The railway tank car is provided with a relief valve which will vent large volumes of gas. Such relief valves in order to have an accurate opening pressure necessarily have a prolonged blowdown period and upon opening vent a large volume of gas before closing. This large volume of gas is likely to be carried by the wind down the railroad track where some industrial installation, some hoboes' fire, or the sparks of a passing locomotive may set the gas on fire and the flames may travel back through the air before the relief valve closes and by heating the tank car raise the pressure therein so that the relief valve remains open and the entire tank car goes up in flames.

One object of the present invention is to provide a method and means for transferring liquefied gas that will prevent the above mentioned type of fires from occurring.

Another object is to provide a relief valve independent from either the tank car or the storage tank so that the independent relief valve will open and relieve pressure without creating a fire hazard to the tank car or the storage tanks.

Another object is to provide such a system in which the independent relief valve will operate in a controlled cycle and will vent the gas in small volumes, which volumes, if the gas is carried by the wind, will be separated from each other by insulating intervals of non-inflammable air.

Another object is to provide a method which will result in a minimum expenditure of power and a maximum conservation of materials and energy and which will prevent fire hazards to the tank car or storage tanks.

Another object is to provide a means of warning the operator of such a system of the opening of the relief valve.

A further object is to provide a suitable arrangement of piping, tanks, valves, gauges and relief valves together with a compressor so as to form a novel and useful system and allow the practice of the novel and useful method set forth.

Other objects are to provide a simple and foolproof system utilizing a minimum of parts to accomplish the above objects.

Numerous other objects and advantages will be apparent to those skilled in the art upon reading the accompanying specification, claims and drawings:

Figure 1:
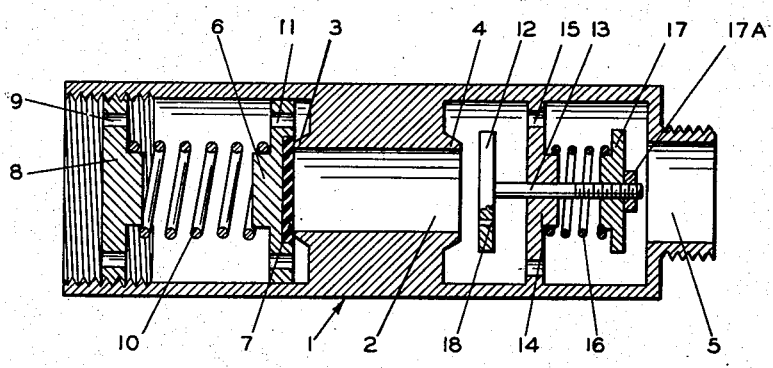
Figure 1 is a cross sectional view with one part therein broken away of the controlled cycle relief valve 1 shown in the system of Figure 2 and also appearing in Figures 3 and 4.

Referring to Figure 1 of the drawings, the numeral 1 delineates the relief valve body interiorly provided with a channel 2 terminating in nozzles or valve seats 3 and 4, respectively. The inlet end 5 of the valve body terminates in a portion which is exteriorly threaded for the purpose of being secured in a system for dispensing liquefied petroleum gases or any similar system where it is particularly desirable to conserve the fluid being transported. The opposite end of the valve body is formed with a chamber for the reception of a relief valve 6. The relief valve has a section 7 of synthetic rubber or other hydrocarbon resistant material. The relief valve chamber is interiorly threaded for the reception of an adjustable nut 8. The nut 8 is provided with passages 9 for the flow of gas. The relief valve 6 is normally maintained tightly sealed against the seat 3 by virtue of the coil spring 10, the compression of which is adjustable by the nut 8. Relief valve 6 is provided with apertures 11 to allow the escape of gases from the system to the atmosphere when the valve is in raised position. An excess flow valve 12 is disposed in a chamber in the inlet end of the valve body and is provided with a stem 13 slidable within a valve guide 14 formed in the interior of the chamber. The valve guide is provided with passages 15. The excess flow valve is normally held in open position by means of spring 16 which bears against a spring adjustment disc 17 threaded to the outer end of the valve stem. A lock nut 17A is screwed on to the valve stem over the adjustment disc to prevent rotation of the disc.

Figure 2:
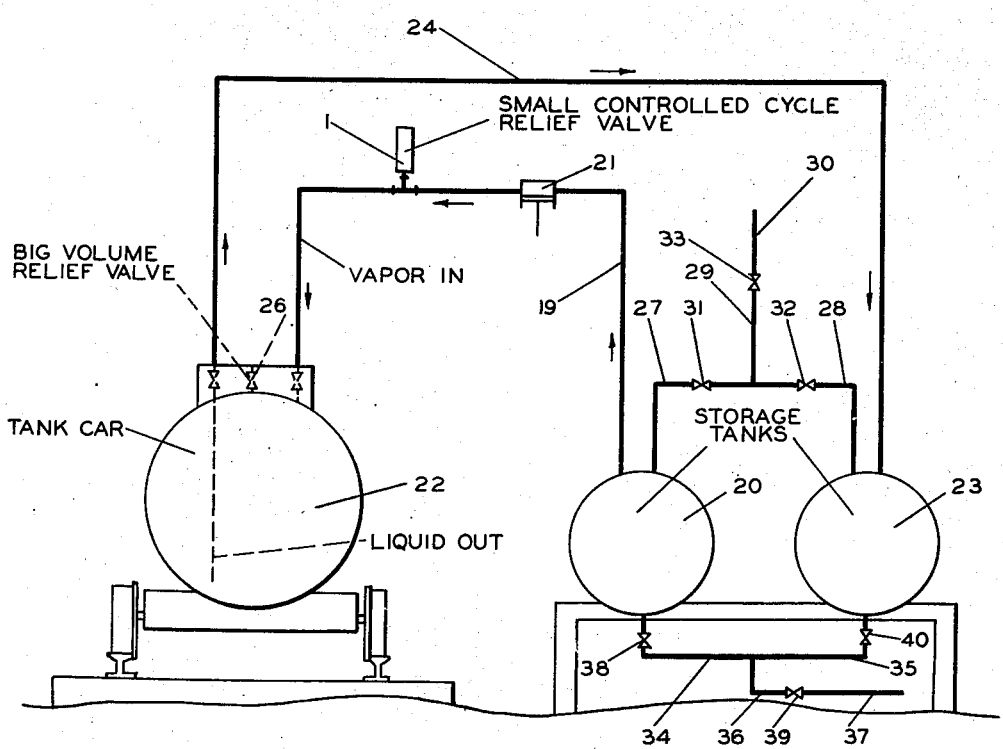
Figure 2 is a diagrammatic elevational view of a system embodying the present invention in which tank car 22 is having its liquid contents transferred to storage tank 23.

Referring to Figure 2 of the drawings, my improved controlled cycle relief valve is shown applied to a system for the transfer of liquefied petroleum gases from a tank car to storage tanks. As shown in the drawings, the relief valve is connected into gas conduit 19 through which gas is pumped from a storage tank 20 by a compressor 21 to a tank car 22 containing liquefied petroleum gases. In a system of the type shown, the gas from the storage tanks is utilized for the purpose of transferring the liquid fuel from the tank car to a second storage tank 23 or in fact the liquid fuel could be transferred to the same tank from which the gas is removed. The tank 23 is connected with the tank car by a conduit 24 which extends below the surface of the liquid contained therein.

The tank car is provided with a relief valve 26 which allows the escape of large volumes of gas whereas valve 1 only allows the escape of disconnected small volumes of gas.

It is customary to connect the top and bottom of the storage tanks 20 and 23. The top of 20 is connected to line 27 and the top of 23 is connected to line 28. A T connection 29 having a continuation 30 is connected in place as shown, being connected to 27 by valve 31, to 28 by valve 32 and to 30 by valve 33.

The lower portions of the tanks are connected by lines 34 and 35 and have a drain line 36 and 37 connected thereto. Line 34 is controlled by valve 38 and the flow from tank 23 to line 35 is controlled by valve 40. The flow in line 36 and 37 is controlled by valve 39.

Figure 3:
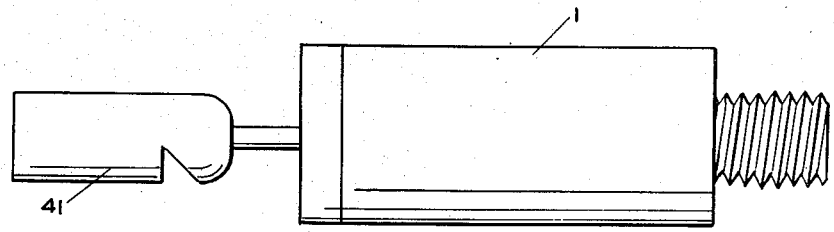
Figure 3 is an elevational view of the relief valve shown in Figure 1 with a warning device 41 attached thereto.

In Figure 3 relief valve 1 is provided with a sound producing device consisting of whistle 41 which may be necessary in case the system is located in a noisy industrial area where the already somewhat noisy operation of relief valve 1 might go unnoticed if the operator is inattentive.

Figure 4:
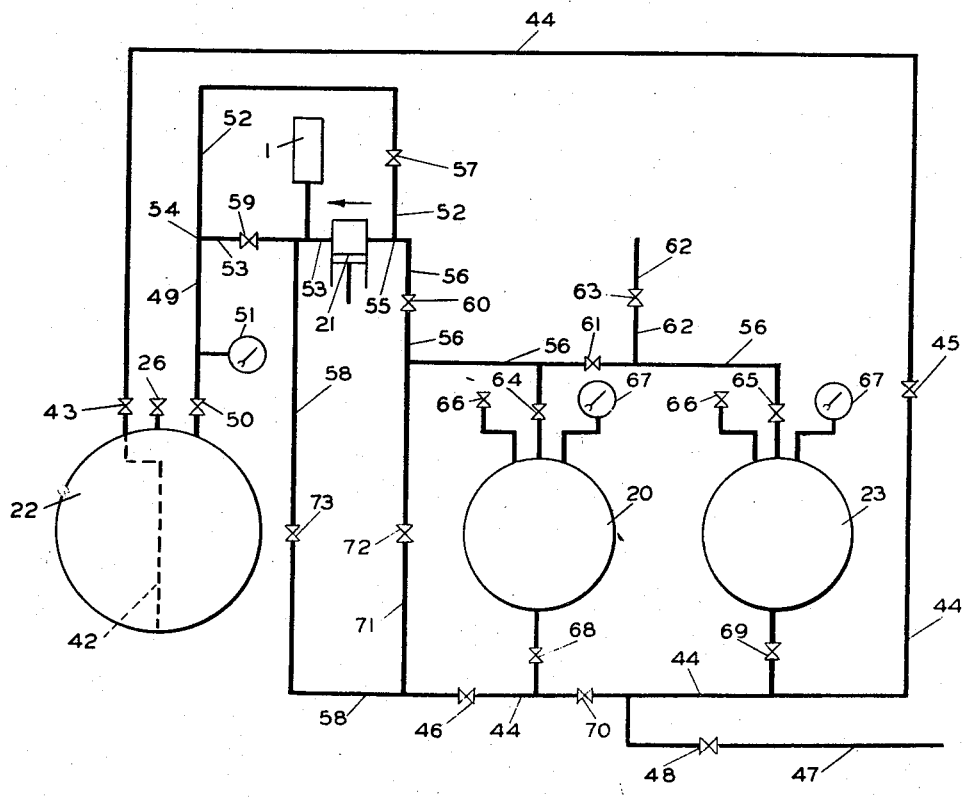
Figure 4 is a view similar to Figure 2 showing a modified system of the type shown in Figure 2.

In Figure 4 is shown a modified system for transferring and storing liquid and gaseous inflammable products coming from tank 22 consisting of a liquid eduction line 42, a valve 43 and a liquid line 44. While valve 43 is shown as a single valve it may consist of two valves one secured to tank 22 and the other secured to line 44 and a connection between the two valves so that the two valves may be closed and the connection disconnected without loss of liquid. For the purpose of simplifying the system only one valve 43 is shown. Line 44 also contains valve 45 which is placed conveniently near storage tanks 20 and 23 for purposes to be set forth later. Liquid line 44 may be regarded as extending to valve 46 and a branch line 47 controlled by valve 48 is provided to carry the liquid off for vaporization and industrial use, such as burning in a furnace (not shown). A vapor line 49 is connected to tank 22 by a valve or valves 50 similar in all details to valve 43 and a gauge 51 may be provided to indicate the pressure in the vapor line 49. Vapor line 49 splits into two parallel branches 52 and 53 at point 54 and the two branches 52 and 53 reunite at point 55 to form a continuation 56 of vapor line 49.

Branch 52 has a valve 57 therein controlling flow therethrough.

Branch 53 has a relief valve 1 of the type shown in Figure 1 or 3 and a side vapor line 58 connected thereto in its central portion. Between the central portion and point 54, line 53 has a controlling valve 59 and between the central portion of line 53 and point 55 line 53 passes through the cylinder of compressor 21. Side vapor line 58 communicates with liquid line 44 when valve 46 is open for purposes to be set forth later.

Vapor line 56 is controlled by a valve 60 and in vapor line 56 between its point of connection with tank 20 and with tank 23 a valve 61 is provided. Vapor may be drawn out of the system through line 62 controlled by valve 63. Tank 20 may be connected to line 56 by valve 64 and tank 23 may be connected to line 56 by valve 65. Tanks 20 and 23 are preferably individually provided with safety relief valves 66 and gauges 67. While two tanks 20 and 23 have been shown in the battery it is obvious that the battery could consist of a large number of tanks (even one tank could be used) without departing from the present invention. Tank 20 is connected at its bottom to liquid line 44 by valve 68 and tank 23 is similarly connected to line 44 by valve 69. Line 44 is provided with a valve 70 between tanks 20 and 23. Lines 56 and 58 are connected by line 71 controlled by valve 72, and line 58 has a valve 73 between 53 and 71.

*Operation*

In operation, the relief valve is normally seated, but when the pressure in the system reaches a predetermined value, th valve will open allowing gas flow through the openings 15 around the periphery of the excess flow valve through the communicating channel 2, passages 11 and 9 to the atmosphere. Unobstructed flow of gas through the relief valve and around the excess flow valve will create a pressure differential across the excess flow valve, causing it to seat against the nozzle 4. When the excess flow valve is closed, shutting off flow to the communicating channel, the relief valve is accordingly closed by means of the coil spring 10. The excess flow valve is provided with a bleed hole 18 to permit a small flow of gas from the system to occur to the communicating channel 2 until a sufficient pressure is built up to allow the spring 16 to again open the excess flow valve. When this occurs, and in the event that the pressure in the system has not receded below the popping pressure of the relief valve, the relief valve will again be forced open and the cycle will be repeated.

In the above described operation the following facts are apparent. First, the relief valve 6 reacts after the fashion of any normal relief valve, having a definite popping pressure and another definite reseating pressure. However, the blow-down of pressure is confined to the communicating passage or chamber 2, by virtue of closure of the valve 12. Thus the blowdown characteristics of the valve 6 as such may be either good or bad without making any material difference in the overall result obtained. Even if the valve 6 required almost complete blowdown in order to reseat, the pressure in the whole storage vessel and related system would not suffer this excessive reduction because of the closure of valve 12.

Second, the operation of the valve will be intermittent, due to alternate opening and closing of the check valve 12. Further, the frequency of the intermittent cycle will be controlled by the size of the opening 18. In Figure 1, this opening has been shown to be small, and the period required for reopening of the check valve would, therefore, be relatively long. However, this opening may be made any size which may be desired and the frequency of the operation cycle will increase accordingly.

It is also pointed out here that the relief valve and check valve elements of my device may be interchanged as to position. In other words, the relief valve may be located nearest the pressure vessel and the check valve nearest the atmosphere, and the overall operation cycle would remain the same. The only difference would lie in the fact that the relief valve would be caused to reseat as a result of a back pressure generated on its outer side when the check valve closes, instead of a reduction of pressure on the inlet side immediately before the relief valve. In both cases, the relief valve closes because of a tendency to equalize pressures on opposing sides of the relief valve disc upon closure of the check valve.

In the operation of my improved control cycle relief valve in a system such as that outlined in Figure 2, the compressor 21 pumps gas from the tank 20 in which fuel gas may have been previously stored into tank car 22 forcing liquid out of the tank through conduit 24 to the storage tank 23. If for any reason, the pressure in the conduit 19 between the compressor and tank car should become excessive or exceed a predetermined point at which the relief valve is set, the relief valve will open until flow of gas passing the excess flow valve forces the same into closed position. This will allow the relief valve to close and a small flow of gas will occur through the bleed hole in the excess flow valve to the communicating channel, as shown in Figure 1. As the pressure on opposite sides of the excess flow valve approaches equilization, the excess flow valve will be again forced open by the spring connected thereto. This cycle will repeat until the pressure in the system has receded below the popping pressure of the relief valve. It is thus obvious that by virtue of the present invention a considerable savings of gas is effected inasmuch as the relief valve does not cause the whole storage system to blow down to a low enough pressure to allow the valve to reseat, and at the same time prevents opening of the larger relief valve in the tank car proper, as previously explained herein.

The operation of Figure 3 is the same as that of Figure 1 described above with the exception that the volumes of gas escaping from relief valve 1 pass through whistle 41 making a noise which may be heard above the general din of neighboring industrial installations.

The operation of Figure 4 is similar to the operation of Figure 2 if valves 59 and 60 of Figure 4 are open and valves 46, 57, 72 and 73 are closed. However, in the transfer of liquid as in Figure 2, the agitation raises the gas pressure in tanks 20 and 23 and Figure 4 provides a way to reduce the pressure. By opening valves 60, 64, 61, 65, 46, 68, 60 and 69 and closing valves 45, 48, 57, 59, 63 and 72 (valves 66 being also closed and valves 26, 43 and 50 no longer part of the system), vapor from the tops of tanks 20 and 23 can be pumped by pump 21 (which pumps in the direction indicated by the arrow above it) through pipe 58 and bubbled up through the liquid in tanks 20 and 23 slowly. This results in condensation of the gas and reduction of the pressure.

In Figure 4 with valves 45, 59, 60, 63, 66 and 48 closed and all the other valves open vapor can be drawn off from tank 22 and condensed in tanks 20 and 23, thus cleaning the car 22 out completely.

Line 71 and valve 72 provide a means of pumping liquid from tanks 20 or 23 to tank 22. By opening valves 43, 45, 50, 59, 60, 69, 72, 46 and 68 and closing all the rest, liquid from tank 20 may be pumped to car 22, the gases in 20 expanding to fill tank 20 while vapors from car 22 are bubbled into tank 23 to condense to liquid. Line 71 and valve 72 need not be provided if the car 22 is merely to always be unloaded, but are useful in an emergency of some sort when the car 22 must be loaded.

Obviously, when loading car 22 the pipes 44 and 49 are shifted to valves 50 and 43 respectively so that the liquid is placed with little disturbance on the bottom through pipe 42 and the vapors are drawn off the top.

It is to be understood that minor changes and modifications may be made by those skilled in the art without departing from the spirit of my invention, the scope of which is defined by the following claims.

Having described my invention, I claim:

1. A system for transferring inflammable liquefied gases and their vapors comprising in combination a first tank, a second tank remote from the first tank, a first high pressure relief valve disposed to relieve excess pressure in one tank at a first predetermined pressure, conduits communicating with said tanks for the transfer of fluids therebetween and a second high pressure relief valve operative intermittently during a blow down period in one of said conduits, said second relief valve being adapted to relieve excess pressure in small volumes at intervals so that escape of inflammable gas from said second relief valve does not normally create a fire hazard to either of said tanks, said second relief valve relieving at a second predetermined pressure substantially below said first predetermined pressure.

2. A system for transferring and storing liquid and gaseous inflammable products comprising in combination a first tank, a first safety valve of a first predetermined opening pressure and having a first predetermined blow down disposed in communication with said first tank, at least two second tanks disposed remote from said first tank, a second safety valve of a second predetermined opening pressure and having a second predetermined blow down in communication with said second tanks, a liquid line extending in communication with the bottoms of all the tanks, valves controlling communication of each of said tanks with said liquid line, a vapor line extending in communication with the tops of all the tanks, valves controlling the communication of each of said tanks with said vapor line, a portion of said vapor line between said first tank and the other tanks splitting into two branches and reuniting, a valve controlling flow in one branch, a valve controlling flow and a pump in the other banch, a side vapor line connected in said other branch between the valve and the pump and communicating with the liquid line, a valve in said side vapor line, a valve in said vapor line between said branched portion and said other tanks, a third safety valve in said other branch between the valve and the pump therein, and an excess flow valve in series with said third safety valve, said third safety valve having a predetermined opening pressure substantially lower than said first or second safety valves and said excess flow valve causing substantially less blow down than said first or second safety valves.

3. A system for transferring and storing liquid and gaseous inflammable products comprising in combination a first tank, a first safety valve of a first predetermined opening pressure and having a first predetermined blow down disposed in communication with said first tank, at least one second tank disposed remote from said first tank, a second safety valve of a second predetermined opening pressure and having a second predetermined blow down in communication with said second tank, a liquid line extending in communication with the bottoms of all the tanks, valves controlling the communication of each of said tanks with said liquid line, a vapor line extending in communication with the tops of all the tanks, valves controlling the communication of each of said tanks with said vapor line, a valve in said vapor line, a third safety valve in said vapor line, said third safety valve having a predetermined opening pressure substantially lower than said first or second safety valves and an excess flow valve in series with said third safety valve to cause substantially less blow down than said first or second safety valves.

4. A system for transferring and storing liquid and gaseous inflammable products comprising in combination a first tank, a first safety valve of a first predetermined opening pressure disposed in communication with said first tank, at least two second tanks disposed remote from said first tank, a second safety valve of a second predetermined opening pressure in communication with said second tank, a liquid line extending in communication with the bottoms of all the tanks, valves controlling the communication of each of said tanks with said liquid line, a vapor line extending in communication with the tops of all the tanks, valves controlling the communication of each of said tanks with said vapor line, a portion of said vapor line between said first tank and the other tanks splitting into two branches and reuniting, a valve controlling flow in one branch, a valve controlling flow and a pump in the other branch, a side vapor line connected in said other branch between the valve and the pump and communicating with the liquid line, a valve in said side vapor line, a valve in said vapor line between said branched portion and said other tanks, an intermittently operating safety valve in said other branch between the valve and the pump therein, said last safety valve having a predetermined opening pressure substantially lower than said first or second safety valves.

5. A system for transferring and storing liquid and gaseous inflammable products comprising in combination a first tank, a first safety valve of a first predetermined opening pressure and having a first predetermined blow down disposed in communication with said first tank, at least two second tanks disposed remote from said first tank, a liquid line extending in communication with the bottoms of all the tanks, valves controlling the communication of each of said tanks with said liquid line, a vapor line extending in communication with the tops of all the tanks, valves controlling the communication of each of said tanks with said vapor line, a portion of said vapor line between said first tank and the other tanks splitting into two branches and reuniting, a valve controlling flow in one branch, a valve controlling flow and a pump in the other branch, a side vapor line connected in said other branch between the valve and the pump and communicating with the liquid line, a valve in said side vapor line, a valve in said vapor line between said branched portion and said other tanks, a second safety valve in said other branch between the valve and the pump therein, and means in series with said second safety valve for causing intermittent operation thereof, said second safety valve having a predetermined opening pressure substantially lower than said first safety valve.

6. A system for transferring and storing liquid and gaseous inflammable products comprising in combination a first tank, a first safety valve of a first predetermined opening pressure disposed in communication with said first tank, at least two second tanks disposed remote from said first tank, a liquid line extending in communication with the bottoms of all the tanks, valves controlling the communication of each of said tanks with said liquid line, a vapor line extending in communication with the tops of all the tanks, valves controlling the communication of each of said tanks with said vapor line, a portion of said vapor line between said first tank and the other tanks splitting into two branches and reuniting, a valve controlling flow in one branch, a valve controlling flow and a pump in the other branch, a side vapor line connected in said other branch between the valve and the pump and communicating with the liquid line, a valve in said side vapor line, a valve in said vapor line between said branched portion and said other tanks, and a vapor operated safety valve in said other branch between the valve and the pump therein, said last safety valve releasing the excess vapor in small successive quantities.

7. A system for transferring and storing liquid and gaseous inflammable products comprising in combination a first tank, a first safety valve of a first predetermined opening pressure disposed in communication with said first tank, at least a second tank disposed remote from said first tank, a second safety valve of a second predetermined opening pressure in communication with said second tank, a liquid line extending in communication with the bottoms of all the tanks, valves controlling the communication of each of said tanks with said liquid line, a vapor line extending in communication with the tops of all the tanks, valves controlling the communication of each of said tanks with said vapor line, a valve in said vapor line, a third safety valve in said vapor line, and a vapor operated means in series with said third safety valve for causing it to release excess vapor intermittently.

8. A system for transferring and storing liquid and gaseous inflammable products comprising in combination a first tank, a first safety valve of a first predetermined opening pressure and having a first predetermined blow down disposed in communication with said first tank, at least a second tank disposed remote from said first tank, a liquid line extending in communication with the bottoms of all the tanks, valves controlling the communication of each of said tanks with said liquid line, a vapor line extending in communication with the tops of all the tanks, valves controlling the communication of each of said tanks with said vapor line, a valve in said vapor line, a second safety valve in said vapor line, and and excess flow valve in series with said second safety valve for controlling its operation to cause substantially less blow down than said first safety valve.

9. In a system for the storage and transportation of liquefied petroleum gases, a storage tank, a discharge line for said tank, a gas supply line connected to the tank, a pump in said supply line, means forming a passage connecting said supply line with an atmosphere of lower pressure, a pressure relief valve normally closing the passage, an excess flow valve in the passage and loading means normally maintaining the flow valve open, said flow valve adapted to be forced closed when the flow through said relief valve exceeds a predetermined value.

10. A system for transferring and storing liquid and gaseous inflammable products comprising in combination a first tank, a first safety valve of a first predetermined opening pressure and having a first predetermined blow down disposed in communication with said first tank, at least a second tank disposed remote from said first tank, a second safety valve of a second predetermined opening pressure and having a second predetermined blow down in communication with said second tank, a liquid line extending in communication with the bottoms of all the tanks, valves controlling communication of each of said tanks with said liquid line, a vapor line extending in communication with the tops of all the tanks, valves controlling the communication of each of said tanks with said vapor line, a portion of said vapor line between said first tank and the other tanks splitting into two branches and reuniting, a valve controlling flow in one branch, a valve controlling flow and a pump in the other branch, a side vapor line connected in said other branch between the valve and the pump and communicating with the liquid line, a valve in said side vapor line, an emergency liquid flow line connecting said vapor line and said liquid line and a valve controlling flow in said emergency liquid flow line, a valve in said vapor line between said branched portion and said other tanks, a third safety valve in said other branch between the valve and the pump therein, and an excess flow valve in series with said third safety valve, said third safety valve having a predetermined opening pressure substantially lower than said first or second safety valves and said excess flow valve causing intermittent operation of said third safety valve during the blow down period of said third safety valve.

11. The method of relieving excess pressure in a system for transferring liquefied inflammable gases from one tank to another distant tank, one of said tanks being located in an industrial zone in which open fires may occur comprising the steps of transferring said gases through a pipe from said one tank to said distant tank, and relieving the pressure in said pipe at a point distant from either tank and distant from any point at which open fires may occur, said relief of said pressure being made during short time intervals separated by time intervals of sufficient duration so that if a breeze should carry the gases to said zone in which open fires may occur there will be sufficient air spaces between the separate clouds of gases released so that a fire in said zone cannot flash back to the point of relief of said gases.

12. The method of dispersing an inflammable gas under pressure which comprises releasing a small cloud of said gas, stopping the flow of said gas, and repeating said steps until the desired amount of gas is dispersed, the flow of said gas being stopped for a sufficient period of time to permit an air barrier to form between each of said clouds of gas so that if clouds remote from the point of release catch fire the fire will not flash back to the point of release.

ALLEN D. KRUGLER.

REFERENCES CITED

The following references are of record in the file of this patent:

UNITED STATES PATENTS

| Number | Name | Date |
| --- | --- | --- |
| 2,001,353 | Salnikoff | May 14, 1935 |
| 2,340,747 | Hansen | Feb. 1, 1944 |
| 2,341,579 | Sundstrom | Feb. 15, 1944 |
| 2,356,410 | Krugar | Aug. 22, 1944 |
| 2,363,960 | Hansen | Nov. 28, 1944 |

FOREIGN PATENTS

| Number | Country | Date |
| --- | --- | --- |
| 424,528 | Great Britain | Feb. 22, 1935 |
| 469,399 | Great Britain | July 23, 1937 |
| 700,679 | Germany | Dec. 27, 1940 |